July 1, 1969     J. L. GIDLEY ET AL     3,452,818
ACID FRACTURING PROCESS
Filed Jan. 10, 1968
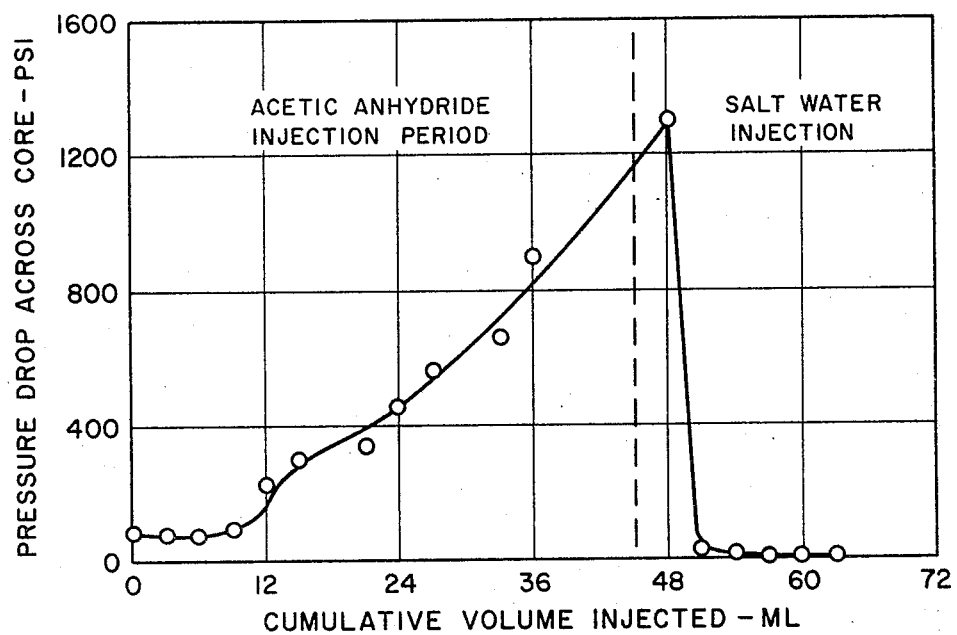
JOHN L. GIDLEY    INVENTORS
FRED S. TOMER
BY *James E. Reed*
ATTORNEY

United States Patent Office 3,452,818
Patented July 1, 1969

3,452,818
ACID FRACTURING PROCESS
John L. Gidley, Houston, Tex., and Fred S. Tomer, Lakewood, Colo., assignors to Esso Production Research Company, a corporation of Delaware
Filed Jan. 10, 1968, Ser. No. 696,867
Int. Cl. E21b 43/27
U.S. Cl. 166—308                              10 Claims

ABSTRACT OF THE DISCLOSURE

A method for increasing the fluid conductivity of a subterranean carbonate formation surrounding a wellbore wherein an organic acid sufficiently concentrated to form a saturated salt solution on reaction with the carbonate rock is introduced into a fracture in the carbonate formation, water or brine is injected to displace the injected acid into the formation, and fluids are thereafter produced from the fracture and surrounding formation into the wellbore.

BACKGROUND OF THE INVENTION

Field of the invention

This invention relates to the acid fracturing of subterranean carbonate formations surrounding oil wells, gas wells and similar boreholes.

Description of the prior art

Acid fracturing techniques have been used extensively for improving the fluid conductivities of subterranean carbonate formations surrounding oil wells, gas wells and similar boreholes. These techniques generally involve the injection of an aqueous hydrochloric acid solution into the wellbore at a rate sufficiently high to break down the surrounding formation. The acid etches the walls of the resulting fracture as it flows into the formation. After the fracture closes, the etched surfaces provide a zone of increased conductivity through which fluids can be injected or produced. Although such techniques often permit greater penetration of the acid than can be obtained without fracturing, the results are generally unpredictable. In many cases the acid tends to "wormhole" into the formation without appreciable etching and hence little or no improvement in the injection or production rate is obtained. Efforts to avoid these difficulties through the use of emulsified acids, gelled acids and chemically retarded acids have been only partially successful.

SUMMARY OF THE INVENTION

This invention provides an improved acid fracturing process that alleviates the difficulties encountered heretofore. As generally carried out, the method of the invention involves the injection of water, brine or a similar aqueous fluid into the wellbore at a rate sufficient to open a fracture in the exposed carbonate formation, the introduction of an organic acid sufficiently concentrated to form a saturated salt solution on reaction with the carbonate rock into the fracture to displace the initial fluid, the injection of a second aqueous fluid into the fracture and adjacent formation behind the acid, and the subsequent production of fluids from the fracture and formation into the wellbore. Laboratory and field tests have shown that this method generally results in considerably deeper penetration of the acid than has generally been obtained with methods available in the past and that this makes possible substantial improvements in the injection or production rate.

The mechanisms responsible for the improved results obtained in accordance with the invention are not fully understood. It is believed, however, that the organic salts which are precipitated as the concentrated acids reacts with the carbonate rock initially shield the rock surfaces from further acid attack. This precludes complete reaction of the acid near the mouth of the fracture and alleviates the formation of "wormholes" extending perpendicular to the fracture faces. More uniform penetration of the acid into the formation over substantially the entire length of the fracture is thus obtained. As the fracture closes and the fluids injected into the formation begin to move back toward it, the aqueous fluid used to break down the formation and the fluid injected behind the acid tend to solubilize the previously insoluble reaction products and further dilute the acid. This promotes further attack of the carbonate rock and leads to the formation of a zone of high permeability extending outwardly on both sides of the fracture along substantially its entire length. The permeability of this zone parallel to the fracture is apparently much higher than that obtained with hydrochloric acid and similar treating agents. The method of the invention thus results in a wide channel of high conductivity which extends a relatively long distance into the formation. Although other phenomena may also be involved, the results obtained strongly suggest that these mechanisms contribute significantly.

The method of the invention is particularly useful in deep formations where bottomhole temperatures and closure stresses are apt to be considerably higher than those encountered in the shallower zones. The higher temperatures promote more rapid reaction of the acid and thus decrease the depth of acid penetration into the fracture. In conventional operations, the acid may be spent close to the wellbore so that little or no etching takes place near the outer ends of the fracture. The etching which does occur may be largely nullified by crumbling of the etched surfaces and the production of formation fines as the fracture closes. The use of a concentrated organic acid in accordance with the invention results in the penetration of acid over substantially the entire length of the fracture and the invasion of active acid into the adjacent rock to form a high permeability zone which extends outwardly on both sides of the fracture. The greater effective length and width thus obtained result in greater stimulation than is normally obtained with conventional methods.

DESCRIPTION OF THE DRAWING

The drawing is a plot showing the effect of a typical organic acid on the permeability of limestone when used in accordance with the invention.

DESCRIPTION OF THE PREFERRED EMBODIMENTS

The initial procedures employed in carrying out the invention will depend in part on the type of well to be treated. In a pumping oil well, for example, it will normally be preferred to unseat the packer and inject brine to displace fluids standing in the wellbore. After this has been done, the sucker rods, pump and associated equipment can be removed from the well. A scratcher or similar device can then be run for the removal of accumulated wax and other foreign material from the perforations or the face of the producing formation. A string of tubing provided with a packer is then lowered into the wellbore to a point above the zone to be treated and the well is filled with brine. In a gas well, on the other hand, little or no preparation is usually necessary. Since the tubing in such a well is normally filled with gas and no pumping equipment is present, the well can be killed by simply injecting brine through the tubing string. The preparation steps employed may thus be similar to those used in the conventional acid fracturing or oil wells, gas wells, water injection wells and similar boreholes and will therefore be familiar to those skilled in the art.

Following preraration of the well, the formation to be treated is generally first broken down by pumping water, brine or a similar aqueous preflush fluid into the formation at a high rate. The rate required will depend on the permeability of the carbonate rock, the viscosity of the fluid used as a preflush, the fracture gradient, and the depth of the formation. Pumping rates on the order of from 5 to 20 barrels per minute have been gound satisfactory in most limestone and dolomite formations but lower rates are sometimes effective, particularly if the permeability is low or the preflush contains a thickening agent or other additives which retard entry of the fluid into the pore spaces. Breakdown of the formation and the generation of a fracture is normally indicated by a sudden reduction in the pressure at the surface. After this occurs, pumping of the preflush is continued until from about 1 to about 12 times the volume of acid to be used has been injected into the fracture. The use of from about 2 to about 6 volumes of preflush for each volume of acid to be injected is preferred.

The preflush employed will normally be a brine containing 3 percent or more sodium chloride but fresh water can be used where clay swelling is not a problem. Aqueous solutions containing other salts and more concentrated brines are also feasible. Water-soluble polyacrylamides and similar polymers which function as friction reducers; thickening agents such as the biopolymers produced by the action of bacteria of the genus Xanthomonas on carbohydrates; surface active agents which serve as demulsifiers; corrosion inhibitors; clay stabilizers; and other additives may be incorporated in the preflush if desired. A variety of different additives designed to overcome difficulties encountered during well treating operations have been suggested heretofore and will be familiar to those skilled in the art. Any additives utilized in the preflush should be compatible with the low molecular weight organic acids which are to be employed for treating the formation.

The low molecular weight organic acids employed for purposes of the invention are aliphatic carboxylic acids containing from about 2 to about 6 carbon atoms per molecule. Examples of such acids include acetic acid, propionic acid, butyric acid, isobutyric acid, valeric acid, caproic acid, hydroxyacetic acid, chloroacetic acid, chloropropionic acid, dichloroacetic acid, pyruvic acid, malic acid, lactic acid, maleic acid, oxalic acid, malonic acid, succinic acid, adipic acid, citric acid, and the like. Mixtures of these and similar aids and the anhydrides of such acids can also be used. The saturated fatty acids containing about 2 to about 4 carbon atoms per molecule are generally preferred. Acetic acid and propionic acid have been found to be particularly effective for purposes of this invention.

Anhydrous acids, acid anhydrides, or solutions of the low molecular weight organic acids having concentrations in excess of those necessary to form saturated salt solutions on reaction of the acids with the carbonate rock are utilized in carrying out the invention. The acid concentration necessary to precipitate the organic acid salts will depend in part on the composition of the carbonate rock to be treated and the particular acid or mixture of acids selected. Most oil-bearing carbonate formations consist primarily of calcium carbonate or mixtures of calcium and magnesium carbonates and hence the solubilities of the calcium salts normally determine the concentrations in which the acids must be used. Studies have shown that dilution of the injected acid or acid solution by connate water in the pore spaces of the formation tends to retard precipitation of the calcium salts and often necessitates the use of higher acid concentrations than would otherwise be required. In order to compensate for this dilution and obtain precipitation of the salts as desired, it is generally preferred to employ acids having concentrations in excess of about 50 percent by weight. Substantially anhydrous acids with concentrations of 85 percent or higher are often particularly effective. Where the formation contains little connate water and it is desired to limit the amount of water injected, however, an acid concentration below 50 percent may be advantageous.

Corrosion inhibitors, demulsifiers, surface tension reducing agents, chemical retarding agents, clay stabilizers, friction reducers and other additives referred to above may be incorporated in the acids or acid solutions if desired. Care should again be taken that the additives selected are compatible with the low molecular weight organic acids.

The quantities in which the organic acids or acid solutions are employed will depend in part upon the thickness of the formation and the distance to which acid penetration is desired. In general, however, the quantities used will range from about 20 to about 1000 gallons of acid or acid solution per foot of formation thickness. The use of from about 20 to about 100 gallons per foot is generally sufficient to overcome formation damage and produce a substantial improvement in the injection or production rate. In certain massive formations, the use of larger quantities is advantageous, particularly where substantial acidizing of the matrix is desired. Methods which can be used to calculate fracture dimensions and are therefore helpful in designing acid fracturing operations have been disclosed in the literature and will be familiar to those skilled in the art. In using such methods, the total quantity of preflush and acid to be employed should be considered. The volume of the afterflush is generally ignored. As pointed out earlier, the amount of preflush employed will normally be from about 1 to about 12 times the quantity of acid to be used. The afterflush is generally employed in similar quantities.

The acid injected into the formation reacts with the carbonate rock to form salts which precipitate when their solubility limit in the partially spent acid is reached. This precipitation apparently results in partial plugging of the pore spaces and shielding of the exposed surfaces against further acid attack. The partial plugging permits more uniform permeation of the acid into the formation than can be obtained with conventional hydrochloric acid. The acid concentration at the leading edge of the injected acid decreases due to reaction with the carbonate and dilution by connate water but since fresh acid passes through the protected zone with little or no reaction, a bank of unspent acid is built up around the fracture. This unspent acid is then available for further reaction with the carbonate rock during the latter part of the process.

The afterflush, which may be water, brine or an aqueous solution containing additives of the type referred to above, is injected into the fracture to displace the acid into the adjacent formation. Injection is continued until a volume equivalent to from about 1 to about 12 times the acid volume has been introduced into the fracture. At this point, the well is shut in and allowed to stand. As the fracture closes, fluids in the formation tend to move parallel to the fracture walls so that mixing of the concentrated acid and afterflush takes place. This solubilizes the salts formed on initial reaction of the acid with the carbonate rock and promotes further acid attack. Further attack also takes place at the interface between the acid and the preflush as the fluids move back toward the wellbore following closure of the fracture. The shut-in period may range from a few hours to several days.

After the fracture has closed and the pressure has declined, the well is opened to permit the backflow of fluids into the wellbore. The insoluble reaction products previously formed are solubilized as the fluids move back toward the wellbore and further dilution of the acid takes place. This exposes new surfaces to acid attack and thus promotes an additional increase in permeability. The fluids produced into the wellbore are normally substantially free of unreacted acid. After the injected fluids have been produced, the well may be returned to normal production.

It will be understood that certain steps in the procedure set forth above are not always necessary. In wells that normally produce large quantities of water, for example, a bank of connate water tends to build up in front of the injected acid and serves to dilute the acid when the well is backflowed. Under these circumstances, the preflush normally employed can be omitted. Although the invention has been discussed primarily in terms of producing oil and gas wells, it is equally applicable to water injection wells and similar boreholes.

The nature and objects of the invention are further illustrated by the following examples.

EXAMPLE I

A core of Indiana limestone one inch in diameter and 2.4 inches long was mounted in a core holder and saturated with a 3 percent sodium chloride solution by evacuating it and then pumping the salt water through it at a rate of 0.0035 milliliter per second until no further change in permeability could be detected. The core had a pore volume of 5.5 milliliters. After injection of the brine, acetic anhydride was injected at the same rate. The pressure drop across the core was measured periodically. It was found that the pressure drop increased rapidly following introduction of the acetic anhydride, indicating that the salts formed by reaction of the acid with the limestone were plugging the core. After about 45 milliliters of the acid had been injected, brine was injected to displace the acid. The pressure drop continued to rise until about one pore volume of the brine had been introduced and then dropped rapidly to a value below that obtained during the initial brine injection step. The results are shown in the drawing. Similar behavior has been obtained with other low molecular weight organic acids.

The results obtained above demonstrate the unique behavior of the concentrated organic acids. The acetic anhydride injected behind the initial brine reacted with the limestone to form calcium acetate in quantities in excess of the solubility limit. Plugging of the pore spaces therefore took place. In the formation adjacent a fracture, such plugging is beneficial because it reduces fluid leak off and thus facilitates extension of the fracture. The salt water injected behind the acid solubilizes the precipitated calcium acetate, thus exposing new surfaces to acid attack. It also dilutes the concentrated acid remaining in the pore spaces and therefore promotes further reaction. Similar behavior takes place as the preflush employed in accordance with the invention moves back toward the concentrated acid in the formation adjacent a fracture. The dilution and solubilization which occur promote additional reaction between the acid and limestone and result in the formation of a highly permeable zone surrounding the fracture. High permeability parallel to the faces of the fracture results in a high conductivity channel through which fluids can be readily injected or produced.

EXAMPLE II

The method of the invention was field tested in a flowing oil well completed in a limestone formation with perforations in the interval between 9038 and 9100 feet. This well was producing 10 barrels of crude oil per day, 942,000 cubic feet of gas per day, and essentially no water prior to treatment. The acid fracturing treatment was carried out by first injecting a 3% sodium chloride brine into the well at the rate of about 13 barrels per minute. The pressure rapidly increased and then suddenly dropped off, indicating that a fracture had been generated. The injection of brine was continued following formation of the fracture until a total of 21,000 gallons of salt water had been introduced. This brine was followed immediately by 7000 gallons of a mixture of glacial acetic acid and acetic anhydride containing 10 mole percent of the anhydride. Again the injection rate was about 13 barrels per minute. The pressure increased following introduction of the acid, indicating that plugging due to the precipitation of calcium acetate was taking place. An additional 21,000 gallons of 3% sodium chloride brine was injected as an afterflush as soon as injection of the acid had been completed. The well was then shut in and allowed to stand until the fracture had closed and the pressure had stabilized. Thereafter, the well was backflowed and returned to production.

Approximately one month after the acid fracturing treatment, the well was making 24 barrels of oil, a trace of water, and about 1,056,000 cubic feet of gas per day. These results, obtained in a reservoir which studies show to be substantially depleted, demonstrate that the method of the invention is surprisingly effective.

We claim:

1. A method for the acid treatment of a subterranean carbonate formation surrounding a well which comprises injecting a low molecular weight aliphatic carboxylic acid containing from 2 to about 6 carbon atoms per molecule into said well at a rate sufficient to open a fracture in said formation, said acid being sufficiently concentrated to form a saturated salt solution on reaction of the acid with carbonates present in said carbonate formation; injecting from about 1 to about 12 volumes of an aqueous afterflush into said fracture for each volume of acid injected; shutting in said well; and thereafter producing fluids from said formation into the wellbore.

2. A method as defined by claim 1 wherein said acid has a concentration in excess of about 50 percent by weight.

3. A method as defined by claim 1 wherein said acid is acetic acid.

4. A method as defined by claim 1 wherein said acid is a mixture of glacial acetic acid and acetic anhydride.

5. A method as defined by claim 1 wherein said acid is propionic acid.

6. A method as defined by claim 1 wherein said afterflush is a sodium chloride brine.

7. A method as defined by claim 1 wherein an aqueous preflush is injected into said fracture prior to the injection of said acid.

8. A method as defined by claim 1 wherein from about 2 to about 6 volumes of said afterflush is injected for each volume of acid injected.

9. A method as defined by claim 1 wherein from about 20 to about 1000 gallons of said acid is injected per foot of formation thickness.

10. A method as defined by claim 1 wherein said acid is a propionic acid solution having a concentration in excess of about 85 percent by weght.

References Cited

UNITED STATES PATENTS

| 2,852,077 | 9/1958  | Cocks           | 166—42 X  |
| 2,863,832 | 12/1958 | Perrine         | 252—8.55  |
| 2,910,436 | 10/1959 | Fatt et al.     | 166—42 X  |
| 3,142,335 | 7/1964  | Dill et al.     | 166—42 X  |
| 3,200,106 | 8/1965  | Dickson et al.  |           |
| 3,251,415 | 5/1966  | Bombardieri et al. | 166—42 |
| 3,271,307 | 9/1966  | Dickson et al.  | 252—8.55  |
| 3,374,835 | 3/1968  | Knox            | 166—42    |
| 3,380,529 | 4/1968  | Hendrickson     | 166—42 X  |

STEPHEN J. NOVOSAD, *Primary Examiner.*